United States Patent [19]
Tanikawa et al.

[11] Patent Number: 5,674,664
[45] Date of Patent: Oct. 7, 1997

[54] METHOD AND REGENERATING IMAGE SUPPORT FROM USED IMAGE-BEARING SUPPORT

[75] Inventors: Kiyoshi Tanikawa; Tadashi Saitoh, both of Tokyo, Japan

[73] Assignee: Ricoh Company, Ltd., Tokyo, Japan

[21] Appl. No.: 322,322

[22] Filed: Oct. 13, 1994

[30] Foreign Application Priority Data

Oct. 13, 1993 [JP] Japan ................................. 5-280152

[51] Int. Cl.⁶ ........................................... G03F 7/42
[52] U.S. Cl. ...................... 430/347; 430/256; 134/2; 134/9; 134/42; 162/4; 162/5
[58] Field of Search ................................. 430/256, 347, 430/329, 128, 126; 134/2, 9, 42; 162/4, 5

[56] References Cited

U.S. PATENT DOCUMENTS

| | | | |
|---|---|---|---|
| 5,302,242 | 4/1994 | Richmann et al. | 162/5 |
| 5,500,328 | 3/1996 | Surash et al. | 430/347 |
| 5,518,581 | 5/1996 | Miyagoshi et al. | 162/5 |
| 5,540,815 | 7/1996 | Igarashi et al. | 162/5 |
| 5,542,985 | 8/1996 | Machida et al. | 134/42 |

*Primary Examiner*—John S. Chu
*Attorney, Agent, or Firm*—Oblon, Spivak, McClelland, Maier & Neustadt, P.C.

[57] ABSTRACT

In a method of and an apparatus for regenerating an image support from a used image-bearing support which bears thereon hydrophobic images formed of thermofusible or heat-softening ink, a plurality of image releasing members are used for removing the hydrophobic images from the used image-bearing support. Specifically, at least one of the image releasing members has a first portion which is able to adhere to the hydrophobic images and a second portion which is unable to adhere to the hydrophobic images, and the image releasing members are arranged in series in order of size of the first portion from small to large along a feeding direction of the used image support. Accordingly, the image releasing members are allowed to adhere to the hydrophobic images in order of size of the first portion from small to large so that the hydrophobic images are removed from the used image support effectively. It is preferable that the image releasing member finally allowed to adhere to the hydrophobic images is a solid image releasing member.

10 Claims, 3 Drawing Sheets

METHOD AND REGENERATING IMAGE SUPPORT FROM USED IMAGE-BEARING SUPPORT

BACKGROUND OF THE INVENTION

1. Field of the Invention

The present invention relates to a method of and an apparatus for regenerating an image support from a used image-bearing or-carrying support which bears thereon images formed of thermofusible or heat-softening ink, and more specifically, to a method of and an apparatus for regenerating copying or printing paper from the used one bearing images thereon.

2. Description of the Prior Art

Because of the recent extensive development of the office automation, paper for printers and copying machines has been used and consumed on a large scale. This has caused serious problems of the global environmental destruction due to large-scale deforestation.

In order to improve the situation, the paper has been recycled by removing the ink images from the paper, crushing the image-removed paper in water and then re-forming it into a sheet of paper. Conventionally, this was considered to be the only method of recycling the paper.

Recently, however, another method has been developed, which deans off printed images from a surface of the used paper and regenerates paper for further copying or printing.

Examples of the latter recycling method have been described in prior art references, which will be introduced hereinbelow;

(1) Japanese First (unexamined) Patent Publication No. 4-64472

A mold-release agent, such as, silicone sealing agent is applied to a surface of non-used copying paper and dried, to produce erasable copying paper which can be recycled. Toner images are formed on the mold-release agent applied surface of the copying paper.

The image-formed surface of the copying paper is caused to adhere to a thermofusible or heat-softening resin (a toner resin as a component forming the images) to remove the toner images so as to regenerate copying paper for further use.

The disclosed method, however, has the following disadvantages:

(a) Since the images are formed on the mold-release agent applied surface, poor image fixing is inevitably resulted.

(b) The toner images are caused to adhere to the thermofusible or heat-softening resin (toner resin) under the application of heat so as to mechanically peel the images of the surface of the copying paper. However, since the toner resin forming the images permeates into fibers of the copying paper, it is impossible to completely remove the toner resin, and thus the toner images. Accordingly, the recycling efficiency of the copying paper is extremely low.

(c) In light of recycling poor resources, double-side copying where images are formed on both sides of the copying paper is evaluated high and will be more popular in the future. Under such circumstances, the recycling method where the mold-release agent is applied to only one side of the copying paper in advance, is evaluated low in efficiency.

(d) On the other hand, when the mold-release agent is applied to both sides of the copying paper, since a silicone sealing agent as the mold-release agent permeates into the copying paper, the resultant copying paper becomes translucent so that it can not be used for the double-side copying.

(e) On a practical basis, it is difficult to make copies with the foregoing erasable copying paper and the plain paper being mixed. Accordingly, the erasable paper and the plain paper should be used separately, which is inefficient.

(2) Japanese First (unexamined) Patent Publication Nos. 1-101576 and 1-101577

A image-bearing copying paper which bears toner images is immersed into an organic solvent with which a toner resin forming the images is soluble, and is then applied with an ultrasonic treatment so as to remove the toner images from the copying paper.

However, since the disclosed method employs an organic solvent, the recycled paper is not suitable for general use in offices and homes due to possible environmental pollution caused by the organic solvent and its combustibility and toxicity.

(3) Japanese First (unexamined) Patent Publication No. 1-297294

An image-bearing support is formed of, such as, plastic, metal, paper having low permeability or ceramics. Images on the support are heated in the presence of a thermofusible or heat-softening separating or releasing member to be stripped off the support.

The disclosed method, however, requires special erasable paper applied with a mold-release treatment to be used. As a result, this method can not be applied to general copying or printing paper now used widely.

In general, images carried on the image support are roughly classified into two kinds; one being a so-called line image having a relatively small print area and thus represented by, such as, a thin character or a thin ruled line, and the other being a so-called solid image having a relatively large area and thus represented by, such as, a picture, a thick character or a thick ruled line.

As appreciated, the line images have less adhesiveness between the paper fibers and the thermofusible or heat-softening ink as compared with the solid images since an adhesive area between the paper fibers and the line images are smaller than that between the paper fibers and the solid images. Further, no adhesion is provided between the line images as opposed to the solid images. As a result, the adhesive strength of the line images is smaller than that of the solid images.

Accordingly, when the conventional method is applied to the image support bearing the images which contain both the line and solid images, since the adhesive strength of the solid images is large as described above, the solid images are likely to be either stripped off incompletely or stripped off along with surfaces of the paper fibers.

SUMMARY OF THE INVENTION

Therefore, it is an object of the present invention to provide an improved method of regenerating an image support from a used image-bearing support by effectively removing images formed on the used image-bearing support.

It is another object of the present invention to provide an improved apparatus for regenerating an image support from a used image-bearing support by effectively removing images formed on the used image-bearing support.

According to one aspect of the present invention, a method of regenerating an image support from a used image support bearing a hydrophobic image comprises the steps of wetting the used image support with at least one of water and an aqueous solution which is selected from the group consisting of an aqueous solution containing a surfactant, an aqueous solution containing a water-soluble polymer and an aqueous solution containing a water-soluble polymer and a surfactant; and causing a plurality of image releasing members to adhere to the hydrophobic image in sequence, under the conditions that the hydrophobic image is heated at least one of the image releasing members having a first portion which is able to adhere to the hydrophobic image and a second portion which is unable to adhere to the hydrophobic image, the plurality of the image releasing members being allowed to adhere to the hydrophobic image in order of size of the first portion from small to large so as to remove the hydrophobic image from the used image support in a wetting state of water or the aqueous solution.

According to another aspect of the present invention, a regenerating apparatus comprises an image support bearing a hydrophobic image; wetting means for wetting the image support with at least one of water and an aqueous solution which is selected from the group consisting of an aqueous solution containing a surfactant, an aqueous solution containing a water-soluble polymer and an aqueous solution containing a water-soluble polymer and a surfactant; and a plurality of image releasing members, at least one of the image releasing members having a first portion which is able to adhere to the hydrophobic image, the plurality of the image releasing members being arranged in series in order of size of the first portion from small to large along a feeding direction of the image support so as to remove the hydrophobic image from the image support in a wetting state of water or the aqueous solution.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to limit the present invention.

In the drawings.

DESCRIPTION OF THE PREFERRED EMBODIMENT

Now, preferred embodiments of the present invention will be described hereinbelow with reference to the accompanying drawings.

According to a first preferred embodiment of the present invention, a regenerating method will be described hereinbelow.

In the regenerating method, images formed on a used image support are removed using a plurality of image separating or releasing members so as to regenerate an image support from the used image-bearing support for further use, such as, copying or printing. The image releasing members to be used in this regenerating method will be described later in detail with reference to FIG. 1 to 6.

As the image support, copying or printing paper may be mainly used. However, the image support is not limited to them, but may also be formed of others which can properly carry the images thereon.

Further, the image support is not necessarily composed of only paper in its entirety. Specifically, it is enough for the image support to have at least one paper layer which includes cellulose fiber as a component and can carry the hydrophobic images made of thermofusible or heat-softening ink or toner. For example, a laminated composite of paper and plastic layers can be used as the image support.

In the regenerating method, before the hydrophobic images on the used image-bearing support and the image releasing members are caused to be in contact with each other, the used image-bearing support is impregnated with at least water or an aqueous solution which is selected from the group consisting of an aqueous solution containing a surfactant, an aqueous solution containing a water-soluble polymer and an aqueous solution containing a water-soluble polymer and a surfactant. The image support may be impregnated with at least one of the foregoing aqueous solutions and dried before the image support carries the images thereon.

As toner component resin of the thermofusible or heat-softening ink to be removed in this preferred embodiment may be, such as, polystyrene, acrylic resin, methacrylic resin, styrene-butylacrylic copolymer, styrene-butadiene copolymer, polyester or epoxy resin.

In general, when paper is wetted with water, it becomes less stiff. At this time, the adhesiveness between the hydrophobic images of the thermofusible or heat-softening ink (toner) carried at the paper layer and the paper layer is extremely weakened.

Specifically, the paper layer made of cellulose fibers as a main component has innumerable irregularities on the surface thereof and innumerable small clearances inside the paper layer due to the cellulose fibers entwined with each other. When the hydrophobic images are carried on such a paper layer, each image fixed in a PPC copying process is larger in size than the corresponding one of the irregularities and the small clearances so that a number of spaces are formed at a contact portion between the cellulose fibers and the hydrophobic image.

When the image-bearing support bearing such a hydrophobic images is impregnated with at least one of the foregoing water and aqueous solution, working as a separating liquid, by means of painting, dipping, spraying or the like, the separating liquid permeates the cellulose fibers and their clearances and spaces due to the capillary action so as to reach the contact portion between the hydrophobic images and the cellulose fibers. Accordingly, the adhesive strength between the hydrophobic images and the cellulose fibers is reduced. In addition, when the cellulose fibers absorb the separating liquid, the cellulose fibers are deformed due to the so-called swelling phenomenon to increase the spaces at the contact portions with the hydrophobic images, thus reducing contact areas between the cellulose fibers and the hydrophobic images, which also reduces the adhesive strength between the cellulose fibers and the hydrophobic images. As a result, the adhesiveness between the cellulose fibers and the hydrophobic images are extremely weakened.

Further, in order to release the hydrophobic images from the paper layer more effectively, the foregoing aqueous solution containing the water-soluble polymer is useful. Specifically, the water-soluble polymer adheres to the hydrophobic images in recessed portions in the paper layer or in the cellulose fibers which can not directly contact with the image releasing member, and peels off those hydrophobic images without damaging the paper layer by means of its adhesive strength.

Typical examples of such a water-soluble polymer are shown in Table 1. As appreciated, the present invention is not limited to these examples.

TABLE 1

TABLE 2

| Kinds of lipophilic group |
| --- |
| Hydrocarbon (composed of carbon chains 6 to 22 in many cases) n-alkyl, branching chain alkyl, substitutional alkyl, aromatic, plural chain alkyl and polyoxyalkylene Partial flourination alkyl and perfect flourination alkyl Polysiloxane class |

TABLE 3

| Kinds of hydrophilic group |
| --- |
| Anionic kind |
| carboxylate, sulfonate, sulfate, phosphate and phosphonate |
| Cationic kind |
| amine salt, quaternary ammonium salt, pyridinium salt, sulfonium salt, phosphonium salt and polyethylene-polyamine |
| Amphoteric kind |
| amino acid, betaine, amino sulfate and sulfobetaine |

TABLE 3-continued

| Kinds of hydrophilic group |
| --- |
| Nonionic kind |
| polyhydric alcohol (glycerol, glucose, sorbitol, cane sugar), amino alcohol, polyethylene glycol, semipolar bond (amine oxide, sulfoxide, amine imide) |

For sufficiently wetting the support paper or the paper layer of the image support bearing the hydrophobic images of the thermofusible or heat-softening ink (toner) with water in a short wettability of the image support paper with water is an important factor. Further, for removing the images from the image support paper, a sufficient amount of water is required to permeate into interface between the thermofusible or heat-softening ink (toner) and the support paper.

In order to facilitate the capillary action and to cause the foregoing separating liquid to rapidly permeate into the image-bearing support carrying the hydrophobic images thereon, a surfactant works effectively. In general, molecules of the surfactant are constituted by a combination of a lipophilic group and a hydrophilic group. Tables 2 and 3 show examples of the lipophilic and hydrophilic groups, respectively. However, the present invention is not limited to these examples.

Although many kinds of surfactants are known, anionic surfactants of fatty acid derivative, sulfate, suofonic acid and phosphate types, etc., cationic surfactants of quaternary ammonium salt, heterocyclic amine, amine derivative, etc., an amphoteric surfactant, a nonionic surfactant, etc. are generally enumerated. Typical examples of these surfactants are shown in Tables 4 to 8. Again, the present invention is not limited to these examples.

TABLE 4 anionic surfactant
- I. carboxylate
  - soap — $RCOO^-$
  - N-acyl amino acid salt — $RCON-COO^-$
  - alkyl ether carboxylate — $RO(C_2H_4O)_nCOO^-$
  - acylation peptide — $RCON-COO^-$
- II. sulfonate
  - alkyl sulfonate — $RSO_4^-$
  - alkylbenzene sulfonate — $R-\text{C}_6\text{H}_4-SO_3^-$
  - alkylnaphthalene sulfonate — $R-\text{C}_{10}\text{H}_6-SO_3^-$
  - sulfo succinic acid salt — $R-OCOCH_2CHCOOR$ | $SO_3^-$
  - a-olefin sulfonate
  - N-acyl sulfonate — $-CON-SO_3^-$
- III. sulfate
  - sulfated oil
  - alkyl sulfate — $ROSO_3^-$
  - alkyl ether sulfate — $R-O(C_2H_4O)_nSO_3^-$
  - alkyl allyl ether sulfate — $R-\text{C}_6\text{H}_4-O(C_2H_4)_nSO_3^-$
  - alkyl amide sulfate — $RCONH-OSO_3^-$
- IV. phosphate
  - alkyl phosphate —
  $$O=P(O^-)(OR)(O^-) \quad O=P(R_1)(OR_2)(O^-)$$
  - alkyl ether phosphate —
  $$O=P(O^-)(O(C_2H_4O)_nR)(O^-)$$
  - alkyl allyl ether phosphate —
  $$O=P(O(C_2H_4O)_nR_1)(O(C_2H_4O)_nR_2)(O^-)$$

TABLE 5

Cationic surfactant

1) Aliphatic amine salt and quaternary ammonium salt thereof $$\begin{pmatrix} R_1 \\ R_2-N \cdot X \\ R_3 \end{pmatrix} \quad \begin{matrix} R_1 = C_{12} \sim C_{18} \\ R_2, R_3 = H \text{ or } CH_3 \\ X = \text{organic or inorganic acid} \end{matrix} \quad (I)$$

TABLE 5-continued

Cationic surfactant $$\begin{pmatrix} CH_3 \\ | \\ R_1-N-R_2 \\ | \\ CH_3 \end{pmatrix}^+ \quad \begin{matrix} R_1 = C_{12} \sim C_{18} \\ X^- \; C_{12} \sim C_{18}, CH_3 \\ X = Cl, Br, I \end{matrix} \quad (II)$$

TABLE 5-continued

Cationic surfactant

2) Aromatic quaternary ammonium salt

TABLE 5-continued

Cationic surfactant $$\left(R_1-\overset{R_2}{\underset{CH_3}{\underset{|}{N}}}-CH_2-\bigcirc\right)^+ X^- \quad \begin{array}{l} R_1=C_{12}\sim C_{18} \\ R_2=CH_3, C_{12}\sim C_{18} \\ X=Cl, Br, I \end{array} \quad (III)$$

3) Heterocyclic quaternary ammonium salt $$\left(\bigcirc N-R\right)^+ X^- \quad \begin{array}{l} R_1=C_{12}\sim C_{18} \\ X=Cl, Br, I \end{array} \quad (IV)$$

$$\left(R_1-\overset{N}{\underset{N}{\underset{R_2\ R_3}{\bigwedge}}}\right)^+ X^- \quad \begin{array}{l} R_1=C_{12}\sim C_{18} \\ R_2=CH_2CH_2OH, CH_3, -\bigcirc, \text{etc.} \\ X=Cl, Br, I \end{array} \quad (V)$$

TABLE 6

Amphoteric surfactant

A. Betaine 1. carboxybetaine $$R_2-\overset{R_2}{\underset{R_3}{\underset{|}{N^+}}}-(CH_2)_nCOO^-$$

($R_1 = C_{12}-C_{18}$; $R_2$, $R_3$: $CH_3$, etc; n = 1~2)

2. sulfobetaine $$R_2-\overset{R_2}{\underset{R_3}{\underset{|}{N^+}}}-(CH_2)_nSO_3^-$$

$R_1 = C_{12}-C_{18}$; $R_2$, $R_3$: $CH_3$, etc; n = 1~2)

B. Aminocarboxylate $$R-\overset{+}{N}H_2-(CH_2)_nCOO^-$$

($R = C_{12}-C_{18}$; n = 1~2)

C. Imidazoline derivative $$R-\overset{N}{\underset{\underset{C}{\parallel}}{\bigwedge}}\overset{CH_2}{\underset{N^+}{\bigwedge}}\overset{CH_2CH_2OH}{\underset{CH_2COO^-}{}}$$

($R = C_{12}-C_{18}$)

TABLE 7

Nonionic surfactant

I. Ether type alkyl and alkyl allyl polyoxy ethylene ether
    alkyl allyl formaldehyde condensation polyoxy ethylene ether
    block polymer having polyoxy propylene as lipophilic group
    polyoxy ethylene-polyoxy propyl alkyl ether II. Ether ester type     polyoxy ethylene ether of glycerol ester
    polyoxy ethylene ether of sorbitan ester

TABLE 7-continued

Nonionic surfactant polyoxy ethylene ether of sorbitol ester

III. Ester type polyethylene glycol-fatty acid ester
    glycerol ester
    polyglycerol ester
    sorbitan ester
    propylene glycol ester
    cane sugar ester IV. Nitrogen-including type     fatty acid alkanol amide
    polyoxy ethylene-fatty acid amide
    polyoxy ethylene-alkyl amine
    amine oxide

TABLE 8

Fluorine surfactant
Similar to normal surfactants, there are the following four kinds of fluorine surfactants.

(1) anionic type
(2) nonionic type
(3) cationic type
(4) amphoteric type

Typical fluorine surfactants product names fluoroalkyl($C_2$-$C_{10}$)carboxylate
N-perfluorooctane sulfonyl disodium glutamate
3-[fluoroalkyl($C_6$-$C_{11}$)oxy]-1-($C_3$-$C_4$)sodium sulfonate
3-[ω-fluoroalkanoyl($C_6$-$C_8$)-N-ethyl amino]-1-propane sodium sulfonate
N-[3-(perfluorooctane sulfonamide)propyl]-N,N-dimethyl-N-carboxymethylene ammonium betaine
fluoroalkyl($C_{11}$-$C_{20}$)carboxylate
perfluoroalkyl carboxylate($C_7$-$C_{13}$)
perfluorooctane sulfonic diethanol amide
perfluoroalkyl($C_4$-$C_{12}$)sulfonate(Li, K, Na)
N-propyl-N-(2-hydroxy ethyl)perfluorooctane sulfonamide
perfluoroalkyl($C_6$-$C_{10}$)sulfonamide propyl trimethyl ammonium salt
perfluoroalkyl($C_6$-$C_{10}$)-N-ethyl sulfonyl glycine salt (K)
bisphosphate(N-perfluorooctyl sulfonyl-N-ethyl amino ethyl
monoperfluoroalkyl($C_6$-$C_{16}$)ethyl phosphate Concentration of a surfactant in the aqueous solution is preferably 0.01% to 20%, and more preferably 0.01% to 5%. When the concentration of the surfactant is excessively high, paper is provided with conductivity so that re-copying quality is deteriorated. On the other hand, concentration of a water-soluble polymer in the aqueous solution is preferably 0.1% to 20%, and more preferably 0.5% to 10%. When the concentration of the water-soluble polymer is excessively high, viscosity of the aqueous solution increases to delay the permeability into the image support.

The surfactants and water-soluble polymers used in this preferred embodiment are used as sizing agents for paper in the paper manufacturing industry. Accordingly, the use of them does not damage the surface of paper, but rather improves the condition of the surface of paper.

Now, the image releasing members to be used in this preferred embodiment will be described hereinbelow with reference to FIGS. 1 to 6. FIGS. 1 to 4 and 6 respectively show the image releasing members each of which has a surface 1 including first and second portions 2 and 3. The first portions 2 are formed of an adhesive material and thus adhere to the hydrophobic images on the image-bearing support, and the second portions 3 are formed of a non-adhesive material and thus do not adhere to the hydrophobic images. Each of these image releasing members can be produced by coating the shown pattern with the adhesive material on the surface 1, formed of the non-adhesive material, of the image releasing member in the form of, such as, a sheet, a belt or a roller. Alternatively, each of those image releasing members can be produced by forming the shown pattern in the form of recess on the surface 1 and by embedding the adhesive material into the recessed pattern. To the contrary, each of the Image releasing members can be produced by coating the shown pattern with the non-adhesive material on the surface 1 which is formed of the adhesive material. Alternatively, each of the image releasing members can be produced by forming the shown pattern in the form of recess on the surface 1 formed of the adhesive material and by embedding the non-adhesive material into the recessed pattern.

According to the foregoing method, the image releasing member can be produced, wherein the portions which can adhere to the hydrophobic images on the image support under the conditions that the hydrophobic image is heated and the portions which can not adhere thereto are provided on the same plane. On the other hand, another type of the image releasing member can be produced by forming the shown pattern in the form of a concavo-convex surface made of the adhesive material. As appreciated, in this case, convex portions adhere to the hydrophobic images while concave portions do not adhere to the hydrophobic images.

Figure 5:
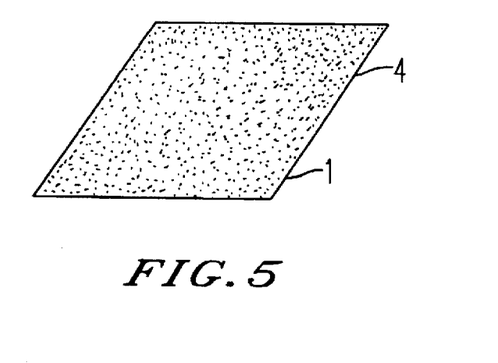
FIG. 5 is a diagram showing a solid image releasing member in the form of a sheet to be used in the preferred embodiment of the present invention.

On the other hand, FIG. 5 shows the image releasing member having the surface 1 which is all adhesive to the hydrophobic images and thus has no portion being non-adhesive to the hydrophobic images (hereinafter referred to as "solid surface 4" or "solid image releasing member").

As described before, in this preferred embodiment, a plurality of the image releasing members are used for removing the hydrophobic images from the image-bearing support in a wetting state of water or the aqueous solution. Specifically, the image releasing members to be used have different sizes of the adhesive portions therebetween, and the image releasing members having the smallest sizes of the adhesive portions is first used to remove portions of the hydrophobic images. Subsequently, the image releasing member having the next larger sizes of the adhesive portions is used to remove portions of the remaining images. In this manner, the image releasing members having larger sizes of the adhesive portions are used in turn. By removing the images in this manner, a large-sized image or even a solid image is divided into smaller portions so as to be removed. Accordingly, the damage to the cellulose fibers which is otherwise caused when peeling off the large-sized or solid image can be effectively prevented. Further, the incomplete removal of the images from the support can also be effectively prevented so that the large-sized or even solid image can be completely stripped off the support.

As a result, the hydrophobic images including the large-sized or solid images can be completely peeled off without damaging the paper layer. Accordingly, the formation of the images and the removal thereof can be repeated to allow the effective recycling of the image support.

Figure 1:
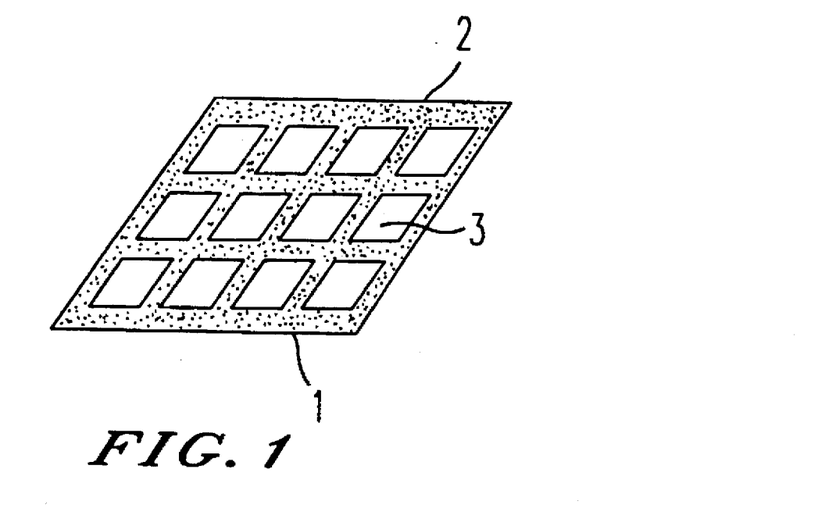
FIG. 1 is a diagram showing an image releasing member in the form of a sheet having adhesive portions and non-adhesive portions, to be used in an image support regenerating method according to a preferred embodiment of the present invention.
Figure 2:
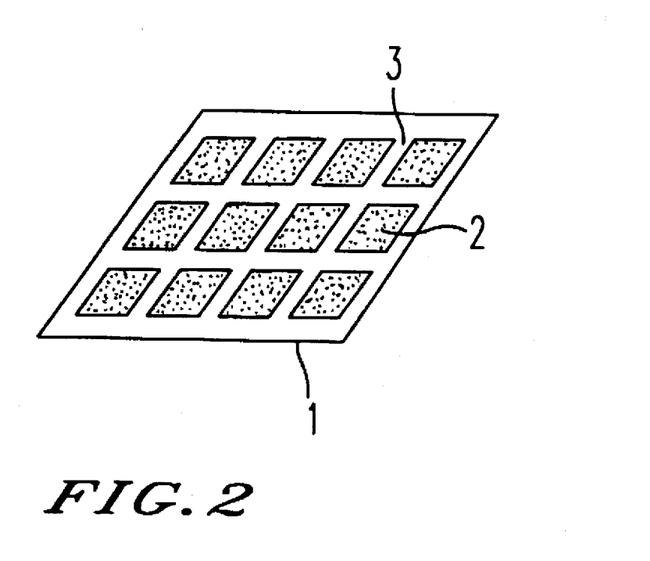
FIG. 2 is a diagram showing a modification of the image releasing member shown in FIG. 1.
Figure 3:
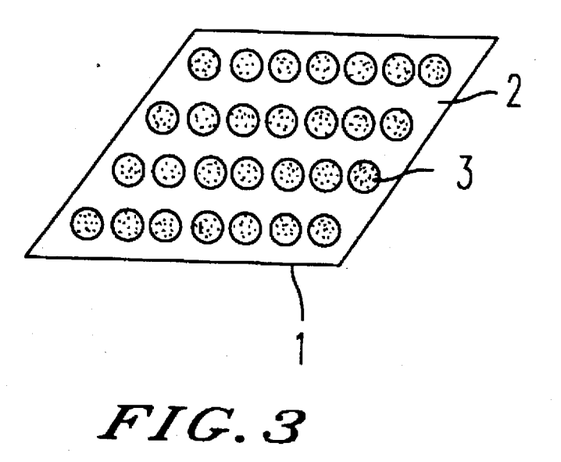
FIG. 3 is a diagram showing a further modification of the image releasing member shown in FIG. 1.
Figure 4:
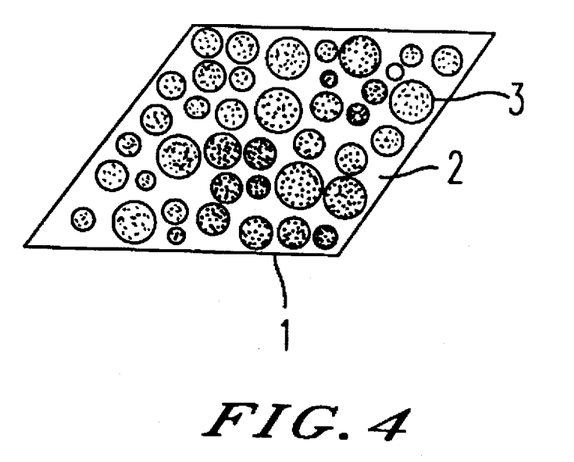
FIG. 4 is a diagram showing a further modification of the image releasing member shown in FIG. 1.
Figure 6:
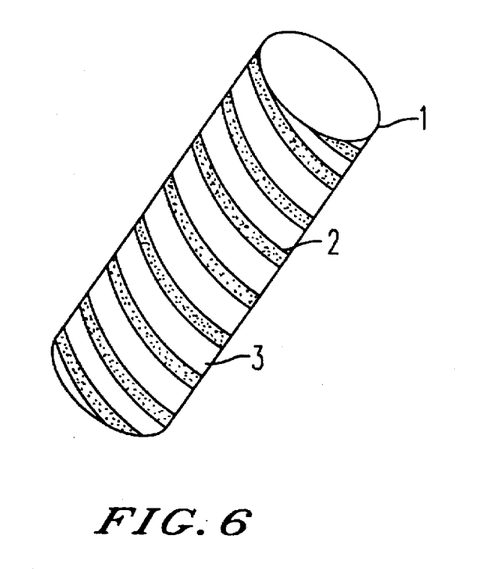
FIG. 6 is a diagram showing an image releasing member in the form of a roller having adhesive portions and non-adhesive portions, to be used in the preferred embodiment of the present invention.

The adhesive portion may have a shape of grid or lattice as shown in FIG. 1, a shape of rectangle as shown in FIG. 2, a shape of circle as shown in FIGS. 3 and 4 or a shape of spiral as shown in FIG. 6. The present invention is not limited to those shapes in the figures, but may have other shapes as long as they provide similar effects, respectively.

Further, the shapes and/or the sizes of the adhesive portions and/or the non-adhesive portions in one image releasing member may be the same with or different from each other.

Further, the shapes and/or the sizes of the adhesive portions and/or the non-adhesive portions between the image releasing members may be the same with or different from each other.

It is to be noted that the number of the image releasing members is not particularly limited as long as it is equal to or more than two. On the other hand, it is preferable that the image releasing member to be used finally is the solid image releasing member having the solid surface 4 with no portion being non-adhesive to the hydrophobic images.

Further, as described before, the image releasing member may be in the form of a sheet, a belt, a roller or the like.

The image releasing members may be formed of the following materials. It is not necessary that the image releasing members are formed of the same material. Specifically, the image releasing members may be formed of different materials which differ in, such as, adhesive strength, affinity or peeling strength. Whether the images can be peeled off or not is determined based on relationship between a sum of, such as, the adhesive strength between the images themselves and the adhesive strength between the images and the paper fibers, and the adhesive strength between the image releasing member and the images. Accordingly, it is effective to select a material of the image releasing member in consideration of those adhesive strengths.

The adhesive portion of the image releasing member may be formed of a high polymer material, such as, polyethylene terephthalate, polystyrene, polypropylene, acrylic resin, methacrylic resin, epoxy resin, styrene-butylacrylic copolymer, styrene-butadiene copolymer. It is particularly preferable that the adhesive portion of the image releasing member is formed of the toner component resin contained in the thermofusible or heat-softening ink or a resin having an SP value similar to that of the toner component resin.

Further, the following component resin of an adhesive may be used as a material of the adhesive portion of the image releasing member:

protein resins of glue, gelatin, albumin, casein, etc., carbonhydrate resins of starch, cellulose, composite polysaccharide, such as, gum arabic, tragacanth rubber, etc., thermoplastic resins of polymer and copolymer of vinyl acetate, acrylic, ethylene copolymer, polyamide, polyester, polyurethane, etc., resins of polychloroprene, nitrile rubber, regenerated robber, SBR, natural rubber, etc.

The present invention is not limited to those materials, but may cover other materials as long as they have the adhesiveness relative to the hydrophobic images, irrespective of whether they are water-soluble or non-water-soluble.

Further, the resin forming the adhesive portion of the image releasing member may be used by forming it into a shape of sheet, belt or roller with a concavo-convex shape on the surface 1, or by being carried, in the form of the pattern, on the surface of a sheet, a belt, a tape or the like made of the non-adhesive material. The latter image releasing member may be produced by providing an adhesive layer, such as, a pressure sensitive adhesive layer of rubber, acrylic, etc., in the form of the pattern, on a supporting body of a cellophane adhesive tape, a Kraft paper tape, a polyvinyl chloride tape, an acetate tape or a filament tape. Further, the latter image releasing member may also be produced by heating to fuse the thermofusible or heat-softening (toner) or its component resin onto an OHP sheet in the form of the pattern.

EXAMPLE 1

Copied images including line and solid images and produced by a commercially available plain paper copying machine (Product Name: "IMAGIO 320 FPI" produced by Ricoh Co., Ltd.) were immersed in water. Thereafter, the image releasing member having small-sized adhesive portions was placed on the copied images, and an integral sheet of the copied images and the image releasing member was applied with heat and pressure by means of a heating roller to perform removal of the images, that is, to peel off portions of the images.

Subsequently, the image releasing member having larger-sized adhesive portions was used to peel off portions of the remaining images by applying heat and pressure.

Finally, the solid image releasing member having no portions being non-adhesive to the hydrophobic images was used to peel off the remaining images by applying heat and pressure. As a result, both the line and solid images in the copied images were fully peeled off so that a re-usable paper sheet of a solid colour was regenerated without impairing a surface of the paper sheet.

Further, the foregoing processes were repeated ten times. A result was that copied images were the same in equality as those of new copying paper.

Comparative Example 1

Only one image releasing member having the adhesive portions and the non-adhesive portions was used. The other conditions were the same as those in the foregoing Example 1.

A result was that both the line and solid images were peeled off only portions thereof. It was difficult to re-use the regenerated paper on a practical basis.

Comparative Example 2

Only the solid image releasing member was used. The other conditions were the same as those in the foregoing Example 1.

A result was that the line Images were clearly peeled off. On the other hand, the paper sheet was broken at the solid images. It was very difficult to re-use the regenerated paper.

Comparative Example 3

The image releasing members having the largest, middle and smallest adhesive portions were prepared and used in the order named. The other conditions were the same as those in the foregoing Example 1.

A result was that the removal of the images was insufficient with the images remaining on the paper, the paper fibers were partially peeled off and the solid images were peeled off at only portions thereof. It was difficult to re-use the regenerated paper.

Now, referring to FIG. 7, an apparatus for performing the foregoing regeneration method will be described hereinbelow.

Figure 7:
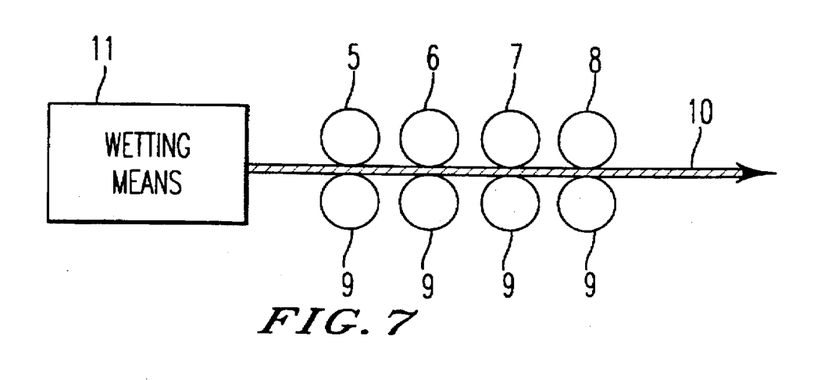
FIG. 7 is a diagram showing schematic structure of an image support regenerating apparatus according to a preferred embodiment of the present invention.

In FIG. 7, numerals 5 to 7 denote image releasing rollers having the smallest, middle and largest adhesive portions, respectively. Numeral 8 denotes a solid image releasing roller having no portions being non-adhesive to images formed on a paper sheet 10. Numerals 9 denotes feed rollers, respectively. As shown in FIG. 7, the paper sheet 10 is wetted by wetting means 11 with at least water or an aqueous solution which is selected from the group consisting of an aqueous solution containing a surfactant, an aqueous solution containing a water-soluble polymer and an aqueous solution containing a water-soluble polymer and a surfactant. Thereafter, the paper sheet 10 is further transferred in a direction of arrow in FIG. 7 so that the image releasing rollers 5 to 8 are applied to the paper sheet 10 in the order named so as to peel off the images on the paper sheet 10 in sequence.

Since the other structure of the regenerating apparatus is known in the art, no further explanation will be made therefor.

It is to be understood that this invention is not to be limited to the preferred embodiments and modifications described above, and that various changes and modifications may be made without departing from the spirit and scope of the invention as defined in the appended claims.

What is claimed is:

1. A method of regenerating an image support from a used image support bearing a hydrophobic image, comprising the steps of:

wetting said used image support with at least one of water and an aqueous solution which is selected from the group consisting of an aqueous solution containing a surfactant, an aqueous solution containing a water-soluble polymer and an aqueous solution containing a water-soluble polymer and a surfactant;

causing a plurality of image releasing members to adhere to the hydrophobic image in sequence, at least one of said image releasing members having a first portion which is able to adhere to the hydrophobic image and a second portion which is unable to adhere to the hydrophobic image, said plurality of the image releasing members being allowed to adhere to the hydrophobic image in order of size of said first portion from small to large; and removing the hydrophobic image from the used image support by transferring the hydrophobic image onto the image releasing members.

2. The method as set forth in claim 1, wherein said first and second portions are formed on the same plane.

3. The method as set forth in claim 1, wherein said first and second portions form a concavo-convex surface, said first portion forming a convex portion of said concavo-convex surface relative to the hydrophobic image.

4. The method as set forth in claim 1, wherein at least one of said plurality of the image releasing members is a solid image releasing member having a size of said second portion being substantially zero and wherein said solid image releasing member has a maximum size of said first portion so that said solid image releasing member is finally allowed to adhere to the hydrophobic.

5. The method as set forth in claim 1, wherein said first portion is formed of one of a resin component of a thermofusible or heat-softening ink forming the hydrophobic image and a resin component of an adhesive.

6. The method as set forth in claim 2, wherein said first portion is formed of a material which is adhesive to the hydrophobic image, and said second portion is formed of a material which is non-adhesive to the hydrophobic image.

7. The method as set forth in claim 3, wherein said first and second portions are both formed of a material which is adhesive to the hydrophobic image.

8. The method as set forth in claim 1, wherein said used image support has at least at its portion a paper layer made of cellulose fibers as a main component, and wherein said hydrophobic image is carried by said paper layer.

9. The method as set forth in claim 1, wherein said method includes causing a plurality of image releasing members to adhere to the hydrophobic image under the conditions that the hydrophobic image is heated.

10. The method as set forth in claim 1, wherein said method includes removing the hydrophobic image from the used image support in a wetting state of water or the aqueous solution.

* * * * *

UNITED STATES PATENT AND TRADEMARK OFFICE
CERTIFICATE OF CORRECTION

PATENT NO. : 5,674,664
DATED : October 7, 1997
INVENTOR(S) : Kiyoshi TANIKAWA et al.

It is certified that error appears in the above-identified patent and that said Letters Patent is hereby corrected as shown below:

On the title page, Item [54], the Title should read:

-- METHOD OF REGENERATING IMAGE SUPPORT FROM USED IMAGE-BEARING SUPPORT --

Column 1, lines 1-3, should read--METHOD OF REGENERATING IMAGE SUPPORT FROM USED IMAGE-BEARING SUPPORT --.

Signed and Sealed this

Twenty-third Day of December, 1997

Attest:

*Attesting Officer*

BRUCE LEHMAN

*Commissioner of Patents and Trademarks*